May 26, 1942.   C. G. FLYGARE ET AL   2,284,606
CAMSHAFT BEARING GRINDING MACHINE
Filed Oct. 13, 1939   3 Sheets-Sheet 1

Inventors
CARL G. FLYGARE
CHARLES C. ALVORD
By Harold W. Eaton
Attorney

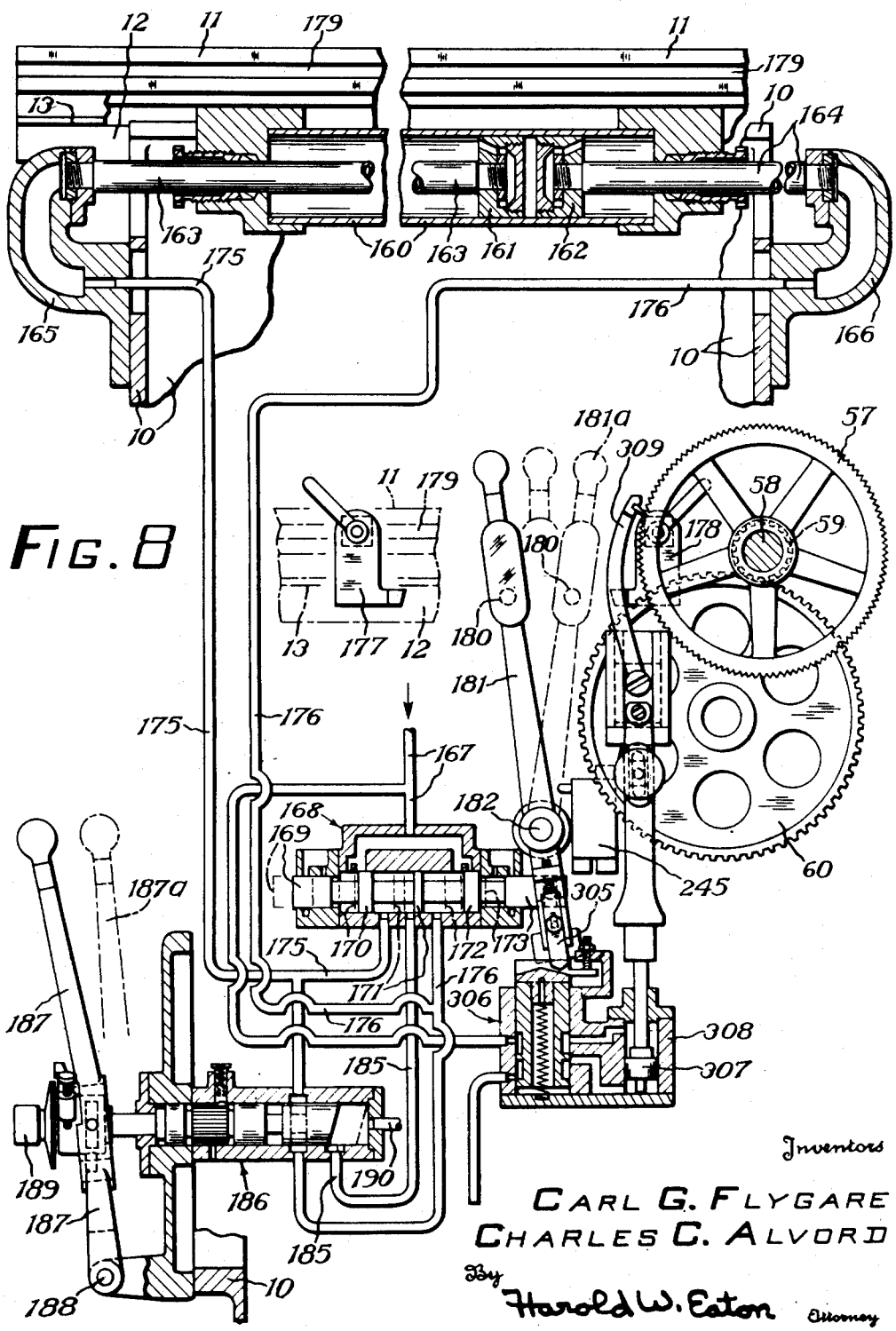

Patented May 26, 1942

2,284,606

UNITED STATES PATENT OFFICE 2,284,606

CAMSHAFT BEARING GRINDING MACHINE

Carl G. Flygare and Charles C. Alvord, Worcester, Mass., assignors to Norton Company, Worcester, Mass., a corporation of Massachusetts Application October 13, 1939, Serial No. 299,252

10 Claims. (Cl. 51—72)

The invention relates to grinding machines, and more particularly to a grinding machine for automatically grinding a plurality of spaced cylindrical portions on a work piece.

One object of the invention is to provide a simple and thoroughly practical grinding machine for automatically grinding a plurality of spaced cylindrical portions on a work piece. Another object of the invention is to provide a grinding machine for grinding a plurality of spaced portions on a work piece, in which the work supporting member is automatically indexed successively to position spaced portions on a work piece in operative relation with the grinding wheel. Another object of the invention is to provide a cylindrical grinding machine in which the work table is automatically indexed successively to position a plurality of spaced portions of a work piece in operative relation with the grinding wheel and in which the grinding wheel and its supporting slide are automatically fed to grind the spaced portions on the work piece to a predetermined size, either of the same or different diameters. Another object of the invention is to provide an automatic camshaft bearing grinding machine in which a plurality of camshaft bearings may be automatically ground to predetermined sizes and in which the several mechanisms of the machine are interlocked. Other objects will be in part obvious or in part pointed out hereinafter.

The invention accordingly consists in the features of construction, combinations of elements, and arrangements of parts, as will be exemplified in the structure to be hereinafter described, and the scope of the application of which will be indicated in the following claims.

In the accompanying drawings, in which is shown one of various possible embodiments of the mechanical features of the invention, Fig. 1 is a front elevation of the improved grinding machine;

Fig. 3 is a cross-sectional view through the stop mechanism for limiting the infeeding movement of the grinding wheel;

Fig. 4 is a fragmentary left-hand end view of the front base of the grinding machine, showing the table indexing or positioning mechanism;

Fig. 5 is a fragmentary cross-sectional view, on an enlarged scale, taken approximately on the line 5—5 of Fig. 4;

Fig. 6 is a fragmentary detail view, on an enlarged scale, showing the different positions of the table indexing and positioning plunger;

Fig. 7 is a fragmentary end elevation of the footstock and grinding wheel, showing the wheel truing apparatus in operative position; and Fig. 8 is a combined fragmentary sectional and diagrammatic view, on an enlarged scale, showing the hydraulic table reciprocating mechanism and wheel feeding mechanism.

Figure 1:
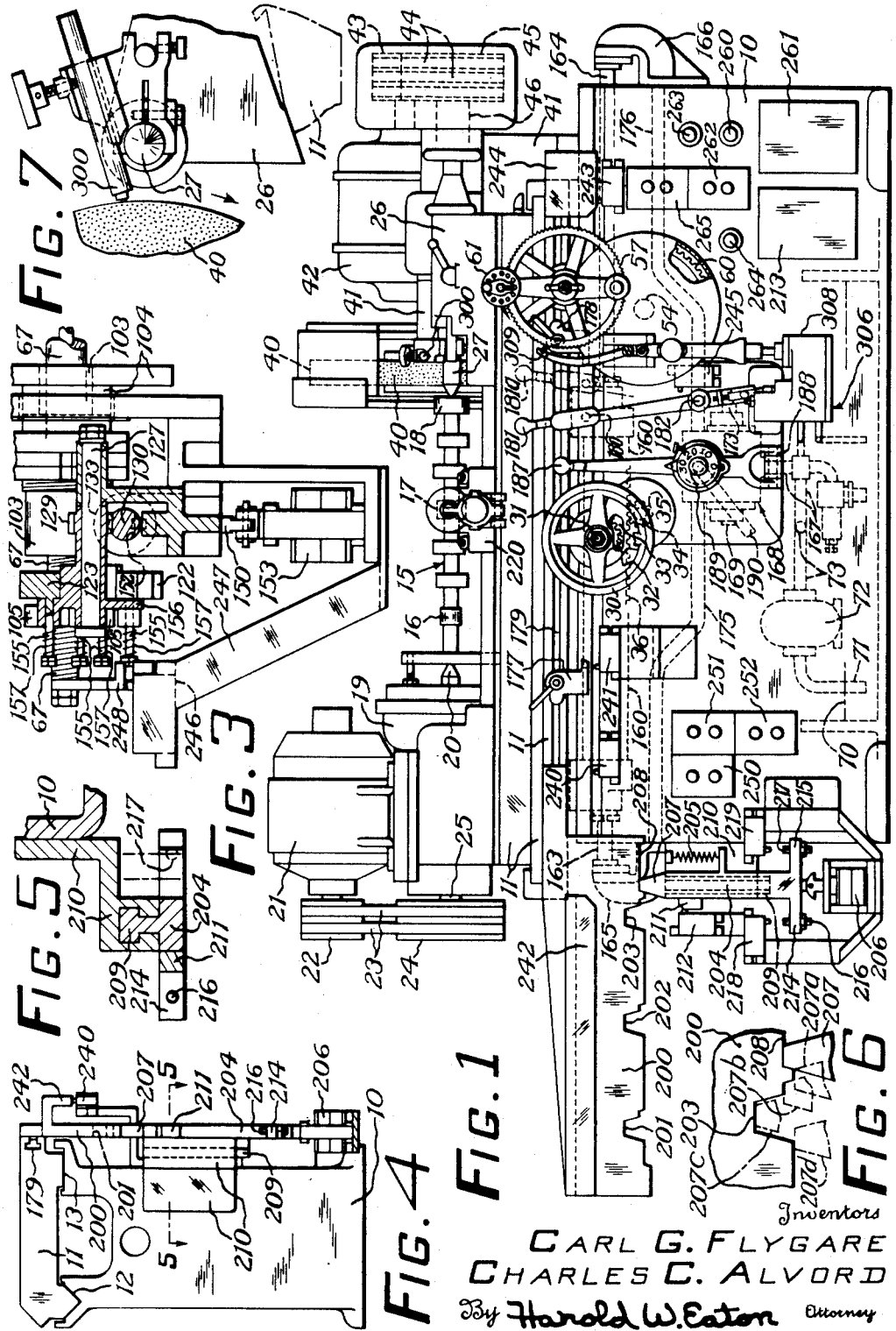

The improved grinding machine has been illustrated in the drawings, comprising a base 10 which supports a longitudinally reciprocable work supporting table 11 on the usual V-way 12 and flat way 13 (Fig. 4). The table 11 serves as a rotatable support for a work piece, such as a camshaft 15 having spaced cylindrical bearing portions 16, 17 and 18 to be ground. A rotatable work support is provided comprising a headstock 19 having a headstock center 20 to support the left-hand end portion of the camshaft 15. The headstock 19 is preferably a motor driven headstock in which an electric motor 21 is mounted on the upper surface of the headstock 19. The motor 21 is provided with a multiple V-groove driving pulley 22 which is connected by a V-belt 23 with a multiple V-groove pulley 24 which is mounted on the end of the headstock spindle 25. A footstock 26 mounted on the table 11 is provided with a work supporting center 27 to engage and rotatably support the footstock end of the camshaft 15 to be ground.

The table 11 is arranged so that it may be traversed longitudinally, either manually or by power. A manually operable traverse mechanism may comprise a manually operable hand wheel 30 which is rotatably supported on a shaft 31. A gear 32 is mounted on the shaft 31 and is arranged to rotate with the hand wheel 30. The gear 32 meshes with a gear 33 which is supported on a shaft 34 which is in turn rotatably supported in the base 10. The shaft 34 also supports a gear 35 which is preferably formed integral with or fixedly mounted to turn with the gear 33. The gear 35 meshes with a rack bar 36 which depends from the under side of the table 11. By rotation of the hand wheel 30 in either direction, a corresponding traversing movement is imparted to the table 11. The power operated mechanism for traversing the work supporting table 11 longitudinally and automatically will be hereinafter described.

A transversely movable rotatable grinding wheel 40 is rotatably supported on a transversely movable wheel slide 41 which is in turn supported on the usual V and flat ways formed on the upper surface of the base 10 and is arranged for a transverse feeding movement whereby the grinding wheel 40 may be fed transversely toward or from the work piece 15, as desired. The wheel 40 is preferably driven by means of an electric motor 42 mounted on the upper surface of the wheel slide 41. The motor 42 is provided with a multiple V-belt driving pulley 43 which is connected by multiple V-belts 44 with a multiple V-groove pulley 45 mounted on the outer end of a wheel spindle 46 which supports the grinding wheel 40 at its other end.

A wheel feeding mechanism is provided for either manually feeding the grinding wheel toward and from the work or for feeding the grinding wheel by power. This wheel feeding mechanism is substantially identical with that shown in the prior U. S. patent to Goehring No. 2,151,660 dated March 21, 1939. A half nut 50 is mounted on the under side of the wheel slide 41 and meshes with or engages a rotatable feed screw 51. A forwardly extending portion 52 of the feed screw 51 is slidably keyed within a rotatable sleeve 53. The rotatable sleeve 53 is formed as an integral part of a rotatable shaft 54 which is mounted in bearings 55 and 56 in the base 10. A manually operable feed wheel 57 is mounted on the outer end of a stud 58 which also carries a pinion 59 meshing with a gear 60 mounted on the outer end of the shaft 54 so that manual rotation of the feed wheel 57 serves to rotate the feed screw 51 in either direction to cause a forward or rearward feeding movement of the grinding wheel 40 and the wheel slide 41. The manually operable feed wheel 57 may be provided with a micrometer adjusting mechanism 61 which is substantially identical with that shown in the above-mentioned prior U. S. patent. The micrometer mechanism 61 serves precisely to adjust a stop abutment (not shown) relative to the manually operable feed wheel 57 to compensate for wheel wear.

In the preferred construction the wheel slide 41 is arranged so that it may be moved toward and from the work piece 15 to grind the same to a predetermined size by means of a fluid pressure actuated feeding mechanism. As illustrated in the drawings, the rear end of the feed screw 51 is rotatably supported in a slidably keyed bearing member 62 which is slidably supported within a casing 63 on the base 10 of the machine. A fluid pressure cylinder 65 is attached to or formed integral with the casing 63 and contains a slidably mounted piston 66 which is connected by a piston rod 67 with the bearing member 62 and is arranged so that when fluid under pressure is admitted to a cylinder chamber 68, the piston 66 will be moved toward the right (Fig. 2) into its rearward or inoperative position, transmitting a corresponding movement through the feed screw 51 and the half nut 50, to move the wheel slide 41 and the grinding wheel 40 rearwardly to an inoperative position. Similarly, when fluid under pressure is admitted to a cylinder chamber 69, a rapid approaching movement of the grinding wheel 40 toward the left (Fig. 2) is provided.

Figure 2:
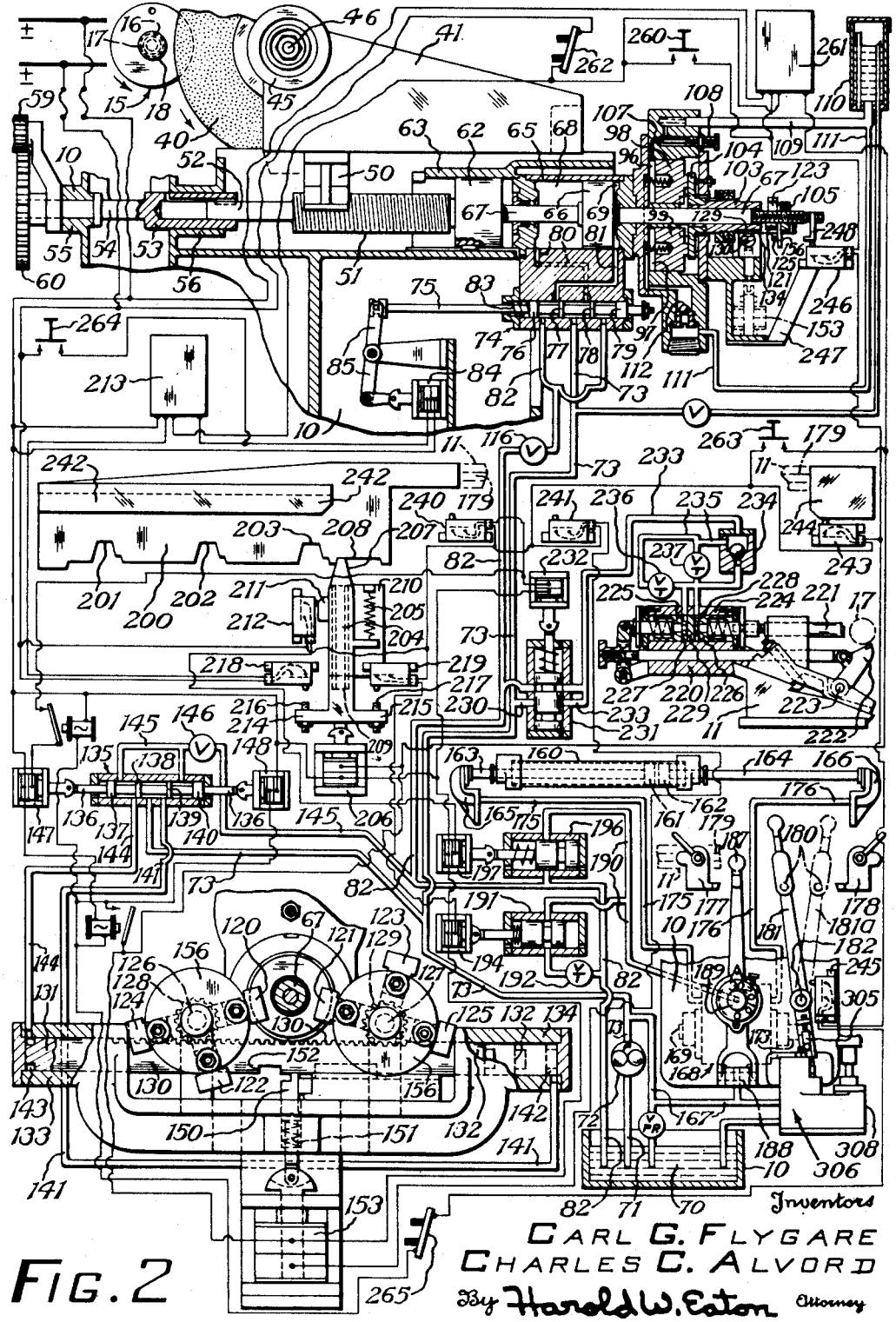
Fig. 2 is a diagrammatic view of the various mechanisms of the machine, showing the piping diagram and the electrical diagram for automatically controlling the grinding cycle.

A fluid pressure system is provided to supply fluid under pressure for moving the piston 66 so as to cause either a forward or rearward feeding movement of the grinding wheel 40. This system may comprise a reservoir 70 which is formed as a box-like section within the base 10. Fluid is conveyed from the reservoir 70 through a pipe 71 by means of a fluid pressure pump 72. The pump 72 forces fluid under pressure through a pipe 73 to a control valve 74. The control valve 74 is preferably a piston type valve comprising a valve stem 75 having formed integral therewith valve pistons 76, 77, 78 and 79. Fluid under pressure passing through the pipe 73 enters a valve chamber located between the valve pistons 77 and 78 and passes through a passage 80 into the cylinder chamber 65 to move the piston 66 to its rearward position with the grinding wheel 40 separated from the work piece 15 (Fig. 2). During the rearward movement of the piston 66 toward the right (Fig. 2), fluid is exhausted from the cylinder chamber 69, through a passage 81, into a valve chamber located between the valve pistons 76 and 77, and out through a pipe 82 which exhausts into the reservoir 70.

The valve stem 75 is arranged so that it may be moved endwise to shift the valve 74 to a reverse position so as to cause either a forward or rearward feeding movement of the grinding wheel 40. A compression spring 83 is provided to maintain the valve 74 normally in its right-hand end position (Fig. 2). A solenoid 84 mounted within the base 10 is provided to shift the valve 74 toward the left (Fig. 2) to cause a forward feeding movement of the grinding wheel 40 when desired. The solenoid 84 is connected to a pivotally mounted rock arm 85, the other end of which is connected to the end of the valve stem 75 in a manner similar to that disclosed in the above-mentioned prior U. S. patent to Goehring No. 2,151,660 to which reference may be had for details of disclosure not contained herein.

A suitable fluid pressure control or feed regulating mechanism is provided for modifying the rapid approaching movement of the grinding wheel caused by the piston 66 to obtain a controlled and predetermined infeeding movement of the grinding wheel 40. A self-contained dash pot feed regulator is provided, comprising a pair of dash pot cylinders 96 and 97 which contain dash pot pistons 98 and 99, respectively. The dash pot pistons 98 and 99 and their respective cylinders 96 and 97 are arranged with their axes parallel to each other and spaced on diametrically opposite sides of the rearwardly extending portion of the piston rod 67. The dash pot pistons 98 and 99 are normally held in a rearward (right-hand) position by means of springs. An adjustable stop screw serves to limit the rearward movement of the dash pot pistons 98 and 99, respectively. This dash pot feed controlling mechanism is identical to that disclosed in the above-mentioned U. S. patent to Goehring No. 2,151,660, to which reference may be had for details of disclosure not contained herein. A slidably mounted sleeve 103 is supported on the rearwardly extending piston rod 67. The sleeve 103 has a flanged portion 104 which is either formed integral therewith or fixedly secured thereto. The flange 104 is arranged to engage the right-hand end faces of the dash pot pistons 98 and 99, respectively. The stop screw above referred to engages the flange 104 and thereby serves to limit the rearward movement of the dash pot pistons 98 and 99.

The rapid forward feeding movement of the grinding wheel 40 and the wheel slide 41 continues until adjustable nuts 105 on a threaded extension of the piston rod 67 engage the right-hand end of the sleeve 103. Continued movement of the piston rod 67 toward the left serves to move the dash pot pistons 98 and 99 in a direction toward the left (Fig. 2). When the flange 104 engages the ends of the dash pot pistons 98 and 99, respectively, the rapid approaching movement of the grinding wheel 40 toward the work piece 15, as produced by the piston 66, is reduced to a slower predetermined grinding feed due to the fact that fluid within the dash pot cylinders 96 and 97, respectively, which are interconnected, must exhaust through a passage 107, a needle valve 108, through a pipe 109, into a reservoir 110. By adjusting the aperture of the needle valve 108, a desired and predetermined infeeding movement of the grinding wheel 40 may be obtained.

During the rearward movement of the dash pot pistons 98 and 99, a suction is created within the dash pot cylinders 96 and 97, respectively, which serves to aid in drawing fluid from the reservoir 110, through a pipe 111 and a ball check valve 112, to fill the dash pot cylinder chambers 96 and 97 for the next infeeding movement of the grinding wheel 40. During the infeeding movement of the dash pot pistons 98 and 99, fluid within the dash pot cylinders 96 and 97 serves to hold the ball check valve 112 closed so that fluid within the dash pot cylinders 96 and 97 is forced out through the passage 107 and the needle valve 108 into the reservoir 110 to control the rate of the infeeding movement as desired.

The forward feeding movement of the grinding wheel 40, as controlled by the dash pot pistons 98 and 99, respectively, continues until adjustable stop blocks to be hereinafter described are moved into operative position between the end of the sleeve 103 and an adjustable collar 105 mounted on the threaded reduced end portion of the piston rod 67.

A throttle valve 116 is located in the pipe line 82 and serves to control the exhaust of fluid from the cylinder 65 so as to regulate the speed of movement of the grinding wheel 40 and the wheel slide 41 during the rapid approaching or positioning movement thereof.

In order to attain one object of the invention, it is desirable to provide a suitable infeed stop mechanism whereby the approaching or grinding feed of the wheel may be stopped successively in a plurality of predetermined positions in case it is desired to grind a plurality of spaced portions of the work piece to different diameters. In the preferred construction, a multi-stop mechanism is provided, comprising a plurality of pairs of stop blocks which are arranged to be successively interposed between the end of the sleeve 103 and the adjustable collar 105 successively to limit the feeding movement of the grinding wheel 40. A plurality of pairs of stop blocks 120—121, 122—123 and 124—125 are provided and arranged to be positioned at substantially diametrically opposite positions with relation to the piston rod 67. The stop blocks 120 and 121 are shown in operative position with respect to the sleeve 103 and the piston rod 67. The stop blocks 120, 122 and 124 are fixedly supported to rotate on a shaft 126. The stop blocks 121, 123 and 125 are fixedly mounted to rotate on the rotatable shaft 127. The shafts 126 and 127 are rotatably journalled in suitable bearings which are fixedly mounted with relation to the base 10 of the machine. The shaft 126 is provided with a gear 128, and the shaft 127 is provided with a gear 129 each of which mesh with a slidably mounted rack bar 130. The opposite ends of the rack bar 130 are formed as pistons 131 and 132 which are slidably mounted within a pair of fluid pressure cylinders 133 and 134, respectively. As illustrated in Fig. 2, the rack bar 130 and piston 131 are shown in the extreme left-hand position. The parts remain in this position while the end portion of the work piece is ground to the predetermined size with the stop blocks 120 and 121 in operative position to be engaged by the collar 105 as it moves forward and which serve to arrest the forward feeding movement of the grinding wheel 40 when the stop blocks 120 and 121 moved by the collar engage the sleeve 103 to prevent a further forward advance of the grinding wheel 40.

In order to automatically shift the pairs of stop blocks successively into an operative position, a fluid pressure mechanism is provided in which fluid under pressure passing through the pipe 73 is conveyed to a control valve 135. The control valve 135 is preferably a piston type valve having a valve stem 136 which has a plurality of valve pistons 137, 138, 139 and 140 formed integral therewith. In the position of the valve 135 (Fig. 2), fluid under pressure passing through the pipe 73 from the pump 72 enters a valve chamber located between the valve pistons 138 and 139 and passes out through a pipe 141 which passes fluid under pressure to a cylinder chamber 142 within the cylinder 134 to move the piston 132, the rack bar 130, and the piston 131 toward the right into the position illustrated in Fig. 2. During the movement of the piston 131 toward the left, fluid within a cylinder chamber 143 is forced out through a pipe 144 into a valve chamber located between the valve pistons 137 and 138, and out through a pipe 145 which exhausts into the reservoir 70. A manually adjustable throttle valve 146 is placed in the pipe line 145 and serves to facilitate regulation of the speed of movement of the piston 131, the rack 130 and the piston 132, thus controling the speed of shifting movement of the gauge blocks above described.

The valve stem 136 is preferably arranged so that it may be shifted automatically in timed relation with the other mechanisms of the machine. The valve 135 is electrically controlled and is shifted toward the left (Fig. 2) by means of a solenoid 147 and toward the right by means of a solenoid 148. The stop blocks 120 and 121 are shown in position for the start of the grinding operation, namely in position for grinding the main bearing at the right-hand end of the camshaft 15. When the table is traversed after the main bearing 18 has been ground and the grinding wheel 40 has been withdrawn to an inoperative position, the solenoid 147 is energized in a manner to be hereinafter described, which serves to shift the valve stem 136 toward the left (Fig. 2) so that fluid under pressure passing through the pipe 73 into the valve chamber located between the valve pistons 138 and 139 passes outwardly through the pipe 144 into the cylinder chamber 143 to move the piston 131, the rack bar 130 and the piston 132 toward the right (Fig. 2).

Movement of the rack bar 130 toward the right (Fig. 2) serves to rotate the gears 28 and 29 in a counterclockwise direction which serves to move the stop blocks 120 and 121 out of operative position and to move the stop blocks 122 and 123 into an operative position. A vertically movable stop plunger 150 which is normally urged in an upward direction by means of a spring 151 rides on the under surface of the rack bar 130. When the bar 130 reaches its central position, with the stop blocks 122 and 123 in an operative position, the stop plunger 150 moves upwardly into engagement with a notch 152 formed in the under side of the rack bar 130, thus preventing further shifting movement of the rack bar 130 and the pistons 131 and 132 toward the right.

A solenoid 153 is operatively connected to actuate the plunger 150 and is arranged when energized to move the plunger 150 downwardly against the compression of the spring 151 to withdraw the plunger 150 so as to allow free movement of the rack bar 130 in either direction. The solenoid 153 is operatively connected with the electrical control system so that it functions automatically in a manner to be hereinafter described.

Each of the gauge blocks 120—121, 122—123 and 124—125 is provided with an integral stem 155 (Fig. 3) which is slidably supported in a frame 156 which is either formed integral with or fixedly mounted to rotate with the gears 128 and 129. A spring 157 surrounds each of the studs 155 projecting beyond the frame 156 and serves to hold the stop blocks yieldably in position in engagement with the rotatable frame 156. The stop blocks are yieldably mounted in a manner above described so that when they are swung into operative position in the path of the adjustable collar 105, the collar 105 will engage the diametrically opposed stop blocks and move them into engagement with the end of the sleeve 103 to limit the forward advance of the grinding wheel 40. Only one of the mountings for the stop blocks has been described in detail. Since all of these stop blocks are mounted in the same manner, it is not deemed necessary to describe each mounting in detail.

A fluid pressure mechanism is provided to reciprocate or traverse the table 11 so as successively to position spaced portions of a work piece, such as the main bearings 16, 17 and 18 of a camshaft 15, in operative relation with the grinding wheel 40. In the form illustrated, a fluid pressure cylinder 160 is fixedly mounted to the under side of the table 11. The cylinder contains a pair of spaced pistons 161 and 162 which are connected by a pair of hollow piston rods 163 and 164, respectively, with a pair of hollow brackets 165 and 166, respectively, which are fixedly mounted on opposite ends of the base 10. The table traversing or reciprocating mechanism utilized in the present disclosure is identical with that shown in the prior U. S. patent to Wallace H. Wood No. 2,071,677 dated February 23, 1937, to which reference may be had for details of disclosure not contained herein.

Fluid under pressure from the fluid pump 72 within the base of the machine acts through the pipe 73 and through a pipe 167 through a reversing valve 168. The reversing valve 168 is preferably a piston type reversing valve in which a plurality of valve pistons 169, 170, 171, 172 and 173 are formed integral with a valve stem. The reversing or control valve 168 is operatively connected by means of pipes 175 and 176 with the brackets 165 and 166, respectively, so that fluid may be forced under pressure to or exhausted from the cylinder 160 to produce the desired traversing or reciprocating movement of the work supporting table 11. The construction of the valve 168 will not be described in detail since this valve is identical with that shown in the prior U. S. patent to Wood above referred to. The valve 168 is a table actuated valve in which a pair of adjustable table dogs 177 and 178, which are supported in a T-slot 179 formed in the front edge of the table 11, act upon a stud 180 carried by a reversing lever 181 which is pivotally supported on a rock shaft 182 and which is arranged when shifted by either of the table dogs 177 or 178 to shift the valve 168 and thus reverse the direction of flow of fluid to the table cylinder 160.

Fluid under pressure from the table cylinder exhausts through the reverse valve 168 and through a pipe 185 to a combined speed control and stop and start valve 186. The valve 186 is manually operated by means of a lever 187 which is supported at its lower end by means of a stud 188 fixedly carried by the base 10. By rotation of the manually operable knob 189, the aperture of the exhaust port may be varied to regulate the traversing speed of the work table 11. Similarly, when the lever 187 is shifted from full line position to the dotted line position 187a (Fig. 8), the valve 186 is shifted to cut off the exhaust of fluid from the table cylinder, thus stopping the longitudinal movement of the table. In this position of the parts, a by-pass is opened whereby fluid may pass freely between the pipes 175 and 176 so that the table 11 may be readily traversed longitudinally by rotation of the manually operable traverse wheel 36. A detailed description of the combined speed control throttle valve 186 as well as the table control or reversing valve 168 is not deemed necessary inasmuch as these two valves are identical with that shown in the prior patent to Wood above referred to. These valves are connected in the same manner and for details of disclosure not contained herein, reference may be had to the prior patent to Wood above referred to.

The valve 186 serves to adjust the speed of movement of the table 11 and in the present application thereof serves to adjust the speed of the table movement for its idle stroke. Fluid exhausting from the valve 186 passes out through a pipe 190 (Fig. 2) and in the position of the parts illustrated in Figs. 2 and 8, passes out through a throttle valve 191 and through a needle valve 192 and a pipe 145 into the reservoir 70. By manipulation of the needle valve 192, a very slow, fine truing speed of the table may be obtained during the interval at which the truing tool is automatically traversed across the face of the grinding wheel to true the same. A solenoid 194 is provided for actuating the valve 191. In the position of the parts as shown in Fig. 2, the solenoid 194 is energized and the valve 191 opened to allow fluid to exhaust from the table cylinder through the valve 186 and the valve 191, and out through the needle valve 192.

It is desirable to provide a slow positioning traverse of the table 11 so that as the table approaches a grinding position, the table will be automatically slowed down and then stopped in a grinding position. To provide a suitable slow traverse positioning speed, a throttle valve 196 is provided. This valve 196 is connected with the pipe 190 and is actuated by means of a solenoid 197 to open the valve. When the valve 196 is positioned as shown in Fig. 2, fluid exhausting through pipe 190 by-passes through the valve 191 and the needle valve 192. When it is desired to automatically speed up the table in a manner to be hereinafter described, a solenoid 197 is energized to open the valve 196 and thus allow fluid exhausting through the pipe 190 to pass directly through the pipe 82 into the reservoir 70. It will be readily apparent from the foregoing disclosure that the valves 191 and 196 serve to produce a fast traversing speed as well as a slow positioning and slow truing speed of the table 11.

In order to provide an intermittent traverse of the work table for successively and automatically positioning spaced portions of a work piece in operative relation with the grinding wheel 40 and also for rapidly returning the work supporting table to its initial position, then automatically truing the grinding wheel and stopping the table in an initial or loading position, it is desirable to provide a suitable controlling mechanism comprising a notched bar 200 which is fixedly secured to move with the table 11. The bar 200 is provided with a plurality of notches 201, 202 and 203, the number of these notches corresponding to the number of portions of the work piece to be ground, and the location thereof on the bar 200 being spaced to correspond with the spacing of the spaced portions, such as the main bearings 16, 17 and 18 of the camshaft 15.

A vertically movable plunger 204 is normally urged in an upward direction by the tension of the spring 205. A solenoid 206 connected to the lower end of the plunger 204 serves when energized to move the plunger 204 downwardly so that its upper tapered end portion 207 is out of the path of the notches in the bar 200. The upper end 207 is out of the path of the notches in the bar 200. The upper end 207 of the plunger 204 is shown in engagement with the left-hand end of a notch 208 formed in the bar 200 (Figs. 1 and 2). This notch 208 determines the truing stroke of the table while a truing tool 300 (Fig. 7) carried by the footstock 26 is being traversed across the periphery of the grinding wheel 40 to true the face thereof. After the shaft 15 has been ground and the wheel trued, the table 11 is stopped in position with the left-hand end of the notch 208 engaging the tapered end 207 of the plunger 204 (Figs. 1 and 2).

When a new work piece 15 has been placed in position on the work supporting centers 20 and 21, respectively, and the cycle of operation is started, the solenoid 206 is energized to cause a downward movement of the tapered end 207 to move it out of the notch 208 for an instant until the table 11 starts its traversing movement toward the right, after which the tapered end 207 assumes the position 207a (Fig. 6). The table 11 continues its movement toward the right and after the plunger end 207a passes over the projection between the notches 208 and 203, the released tension of the spring 205 moves the tapered end 207 of the plunger 204 into position 207b (Fig. 6). During the movement of the plunger 204 into the position 207a, means are provided for automatically slowing down the traversing speed of the table 11 as it approaches a grinding position. The table 11 continues its slow movement toward the right until the tapered portion 207 of the plunger 204 assumes the position 207c, at which point the released tension of the spring 205 again moves the plunger 204 upwardly so that its tapered end is confined within the notch 203 in the bar 200. When the plunger 204 reaches this position, the table, which has been previously slowed down, is brought to rest with the tapered portions of the plunger 204 within the notch 203 but having clearance on its sides. It should be readily apparent from the foregoing disclosure, therefore, that the bar 200 serves to cooperate with the plunger 204 and thus control the cycle of operation, and does not serve as a precise locating and positioning device for the table 11. The plunger 204 is preferably formed with a slideway of T-shaped cross-sectional area (Fig. 5) which is arranged to slide vertically in a correspondingly shaped slideway formed within a bracket 210, and which is fixedly mounted on the base 10 of the machine.

The plunger 204 which is actuated in an upward direction by the tension of the spring 205 and in a downward direction by means of the solenoid 206 serves electrically to interlock and control various mechanisms of the machine. When the plunger 204 moves upwardly into the position illustrated in Figs. 1 and 2, a cam 211 carried by the plunger 204 actuates a normally closed limit switch 212 which serves to deenergize the solenoid 197 to close the normally closed valve 196 to slow down the traversing speed of the table 11.

The lower end of the plunger 204 is provided with two outwardly extending arms 214 and 215 each of which is provided with an adjustably mounted screw 216 and 217 which serve respectively to actuate a normally open limit switch 218 and a normally closed limit switch 219 when the plunger 204 is moved upwardly so that its end 207 is in position 207c (Fig. 6). The closing of the normally open switch 218 serves to set a time delay relay 213 in motion and at the same time to energize the solenoid 84 to initiate a forward feeding movement of the grinding wheel 40. The electrical time relay 213 is connected and arranged to control the feeding cycle of the grinding wheel. The limit switch 219 is interconnected with the other electrical control apparatus in a manner to be hereinafter described.

In grinding a long cylindrical work piece, such as the main bearings 16, 17 and 18 of a camshaft 15, it is desirable to provide a suitable steadying support for the work piece 15, especially while grinding the central portion of the work piece 15, in order that the axis of rotation of the work piece 15 may be maintained in its normal position against the thrust of the grinding operation. It is, therefore, desirable to provide a steadyrest for automatically engaging the center bearing 17 of the camshaft 15 when this bearing portion is moved into operative relation with the grinding wheel 40. As illustrated in Fig. 2, a steadyrest is provided, of the type shown in the prior U. S. patent to Flygare No. 2,086,024 dated July 6, 1937, to which reference may be had for details of disclosure not contained herein. This steadyrest comprises a frame 220 which is mounted on the table 11 of the machine. The steadyrest frame 220 supports a horizontally movable shoe 221 and a pivotally mounted shoe 222 which are arranged so that the lower pivotally mounted steadyrest shoe 222 is moved into operative supporting engagement with the work, preferably before the shoe 221 is moved into engagement therewith. The shoe 222 is pivotally supported on a stud 223 on the steadyrest frame. The steadyrest shoes are normally held in an inoperative position, separated from the work piece 15 by means of springs contained within a cylinder 224. A pair of spaced pistons 225 and 226 are slidably mounted in the cylinder 224. Fluid under pressure is admitted simultaneously to a pair of cylinder chambers 227 and 228 arranged on opposite sides of a central dividing partition 229 within the cylinder 224.

Fluid under pressure from the fluid pump 72 passes through a pipe 73 and a pipe 230 to a steadyrest control valve 231 which is normally held in a downward position (Fig. 2) by means of a spring. A solenoid 232 is provided to shift the valve 231 in an upward direction so as to admit fluid under pressure from the pipe 230 into a pipe 233 which passes fluid through the upper chamber of a ball check valve 234 and from there through a pipe 235 and through needle valves 236 and 237, respectively, into cylinder chambers 227 and 228, respectively. By adjustment of the valves 236 and 237, the admission of fluid under pressure may be varied so as to time the movement of the steadyrest shoes 221 and 222 into an operative position. The solenoid 232 is preferably arranged so that it is energized when the stop block actuating mechanism is actuated to bring the stop blocks 122—123 for sizing the central bearing 17 of the camshaft 15 during the movement of the table 11 to position bearing 17 in operative relation with the grinding wheel 40. The steadyrest shoes 221 and 222 are maintained in operative contact with the central bearing 17 of the camshaft 15 during the grinding operation performed thereon and are arranged so that they may be maintained in operative supporting engagement while the table 11 is traversed toward the right to position the main bearing 16 in operative relation with the grinding wheel and to remain in supporting engagement therewith during this operation.

A pair of normally open limit switches 240 and 241 are adjustably mounted on the front of the machine base and are arranged in the path of a cam or dog 242 which is fixedly mounted relative to the table 11. As the table 11 moves toward the right, the cam 242 first closes the limit switch 240 and then after the table 11 traverses a further distance, closes the limit switch 241. These limit switches are interconnected to aid in controlling the cycle of operation in a manner to be hereinafter described.

Another normally closed limit switch 243 is mounted on the base 10 of the machine adjacent to the right-hand end thereof and is arranged in the path of a dog or cam 244 carried by the table 11, so that when the table is moved to its extreme left-hand position (Fig. 1), the cam or dog 244 serves to open the normally closed limit switch 243 which serves in a manner to be hereinafter described to energize the solenoid 153 and also to interlock with the other mechanisms of the machine to effect an automatic rapid movement of the table toward the left. The limit switch 243 is connected with other mechanisms of the machine in a manner to be hereinafter described.

A normally open limit switch 245 (Figs. 1, 2 and 8) is mounted on the base 10 of the machine and is located in a position to be actuated by the reversing lever 181 when it is swung from the full line position (Fig. 1) into the dotted line position 181a.

A normally open limit switch 246 (Figs. 2 and 3) is mounted on a bracket 247 which is fixed to the base 10 of the machine. The limit switch 246 is located directly at the rear of the machine base and its actuating plunger is arranged in the path of an actuating detent 248 which is adjustably supported on the threaded end portion of the piston rod 67 and is arranged so that when the grinding wheel 40 together with its actuating mechanism is moved rearwardly to an inoperative position, the switch 246 will be automatically closed. This switch is connected with other mechanisms of the machine in a manner to be hereinafter described.

The various electrically driven units of the machine are preferably controlled from the operator's control station in front of the machine. A plurality of push button switches are provided on the front of the machine base, including a push button switch 250 which is operatively connected to stop and start the headstock motor 21. A switch 251 is provided to control the starting and stopping of the wheel driving motor 42 and a push button switch 252 is operatively connected to control the stopping and starting of a motor for driving the fluid pressure pump 72.

A push button 260 located on the front of the machine base is a manually operable cycle starting button which serves when closed to set in motion an electrical time delay relay 261 and at the same time to energize the solenoid 206 to cause a downward movement of the plunger 204. The timer 261 is set so that after the plunger 207 has been withdrawn from the full line position (Fig. 6) into position 207a, the table moves to the right and the time relay 261 operates to deenergize the solenoid 206 so as to allow the plunger 207 to drop into engagement with the projection on the bar 200 so that the table is free to continue its movement toward the right and the automatic cycle of grinding continues.

A push button switch 262 is provided for breaking the circuit in case it is desired to control the movement of the grinding wheel and the work supporting table manually. When the switch 262 is opened to facilitate a manual control of the machine, a push button switch 263 may be actuated manually which serves to energize the solenoid 206 to withdraw the plunger 204 to allow a traversing movement of the table 11 under the control of the fluid pressure mechanism. Push button switch 264 is shunted around the time delay relay 213 and is arranged so that the feed solenoid 34 may be energized when desired to cause a forward feeding movement of the grinding wheel 40. The push buttons 260, 263 and 264 are normally open switches and are arranged so that they close the circuit only when held closed manually by the operator. A push button switch 265 is provided for stopping the automatic grinding cycle and is especially adapted for stopping the rapid return movement of the table 11 in case it is desired to bring the wheel in and touch up or regrind one of the bearing portions on the return stroke. If the push button switch 265 is opened, this serves to break a circuit, thus deenergizing the solenoid 206 so that the released tension of the spring 205 moves the plunger 204 upwardly so that it rises on the under surface of the notched bar 200. The grinding wheel 40 may then be fed in manually by closing the normally open push button switch 264. After the bearing has been touched up or ground, the switch 265 may again be closed and the remainder of the automatic cycle continued to completion.

The operation of this improved grinding machine is readily apparent from the foregoing disclosure. A work piece, such as a cam shaft 15 having three main bearings 16, 17 and 18 to be ground, is mounted in position on the headstock center 20 and footstock center 27. The push button 250 is then actuated to start the work rotation, the push button 251 is actuated to start the wheel drive motor 42, and the push button 252 is actuated to start the fluid pressure pump 72. Assuming the parts of the machine to be as illustrated in Fig. 1 with the work supporting table positioned in a loading position, the cycle starting switch 260 is closed which serves to energize the solenoid 206 to move the plunger 204 downwardly and at the same time to set in motion the electrical time delay relay 261.

Assuming the lever 187 to be in the position illustrated in Fig. 8, fluid under pressure is being conveyed to the cylinder chamber at the right of the piston 162 to move the table 11 toward the right. The time delay relay 261 is set so that as soon as the table 11 starts its movement to the right, the solenoid 206 is deenergized, thus allowing the released tension of the spring 205 to return the plunger 204 so that its tapered surface rides on the projection 208 of the notched bar 200. The table 11 continues its movement toward the right under the influence of fluid pressure and after the tapered portion 207 of the plunger 204 rides over the projection 208 of the notched bar 200, the released tension of the spring 205 moves the plunger 204 upwardly so that the cam 211 opens the normally closed limit switch 212 which serves to break a circuit so as to deenergize the solenoid 197, thus allowing the valve 196 to return to the position illustrated in Fig. 2 which cuts off the exhaust of fluid from the table cylinder and necessitates the exhaust flowing through the valve 191 and the needle valve 192 which slows down the table movement as the tapered portion 207 of the plunger 204 approaches alignment with the notch 203. When the portion 207 is aligned with the notch 203, the released compression of the spring 205 moves the plunger 204 upwardly so that the normally closed limit switch 219 is opened by the screw 217 to deenergize the solenoid 194, thus releasing the compression of a spring within the valve 191 to close the valve 191, thus completely cutting off the exhaust of fluid from the table cylinder 160 to stop the table movement when the main bearing 18 is in operative position opposite the grinding wheel 40.

During the upward movement of the plunger 204 into the notch 203, the screw 216 closes the normally open limit switch 218 which serves to set the time delay relay 213 in motion and at the same time to energize the solenoid 84 to start an infeed grinding cycle of the wheel 40.

The grinding wheel feeds into the work in the manner above described by fluid under pressure within the cylinder 65, first at a rapid rate and then at a slow rate, as determined by the actuation of the dash pot pistons 98 and 99. The forward feed of the wheel continues until the pair of diametrically opposite stops 120 and 121 limits the infeed to stop the infeeding movement. The grinding wheel remains in engagement with the work to finish grind the bearing 18 until the time delay relay 213 actuates to deenergize the solenoid 84, thus allowing the released compression of the spring 83 to return the feed control valve 74 to the position illustrated in Fig. 2. The wheel and its supporting slide then move in a rearward direction and as the wheel approaches its rearmost or inoperative position, the projection 248 carried on the rear end of the piston rod 67 closes the normally open limit switch 246 to again set the time relay 261 in motion. At the same time, the solenoid 206 is energized to cause a downward movement of the plunger 204 to withdraw the tapered end portion 207 from the notch 203. The fluid pressure being still applied to the cylinder chamber at the right of the piston 162, and the solenoids 194 and 197 again being energized, the table starts its traversing movement again toward the right. After the table has moved a short distance toward the right, the time relay 261 operates to deenergize the solenoid 206, thereby releasing the tension of the spring 205 and allowing the tapered end 207 of the plunger 204 to ride on the under surface of the notched bar 200.

During this traversing movement the cam 242 carried by the notched bar 200 engages and closes the normally open limit switch 240 which serves to close a circuit and energize the solenoid 232 to shift the valve 231 in an upward direction, thus admitting fluid under pressure from the pipe 230 into the steadyrest cylinder chambers 227 and 228 to move the steadyrest shoes 222 and 221, respectively, into operative engagement with the center main bearing 17 of the shaft 215. At the same time, the closing of the limit switch 240 serves to energize the solenoid 147 to shift the valve stem 136 so as to admit fluid under pressure through the pipe 144 into the cylinder chamber 143 to shift the piston 131 and the rack bar 130 toward the right (Fig. 2). This movement of the rack bar 130 serves through the mechanism above described to shift the stop blocks 122 and 123 into an operative position with relation to the feed mechanism.

When the traversing movement of the table has moved sufficiently to allow the tapered end 207 of the plunger 204 to drop into the notch adjacent to the central notch 202, the upward movement of the plunger again moves the cam 211 upwardly to open the normally closed limit switch 212 to again deenergize the solenoid 197 which permits the valve 196 to close, thus causing fluid exhausting from the table cylinder 160 to pass through the valve 191 and needle valve 192 which serves to slow down the traversing movement of the table as the central notch 202 approaches alignment with the plunger 207. When the plunger 207 is aligned with the notch 202, the released tension of the spring 205 again shifts the plunger 204 upwardly to open the normally closed limit switch 219 which deenergizes the solenoid 194, thus allowing the valve 191 to close, thereby cutting off all exhaust of fluid from the table cylinder 160 to stop the table movement.

During the upward movement of the plunger 204 into engagement with the notch 202, the normally open limit switch 218 is closed by the screw 216 to again set the time delay relay 213 in motion and at the same time to energize the solenoid 84 to initiate a grinding cycle. The infeeding movement of the grinding wheel continues until the stop blocks 122 and 123 respectively limit the infeeding advance of the wheel so as to grind the center main bearing 17 of the shaft 15 to the desired and predetermined size. During this infeeding movement of the grinding wheel, the steadyrest shoes 221 and 222 are maintained in supporting engagement with the bearing 17 to support and steady the shaft during the grinding of the center bearings.

After a predetermined time interval the time relay 213 again deenergizes the solenoid 84 to initiate a rearward movement of the wheel 40 and its supporting and actuating parts. When the wheel 40 approaches its rearmost or inoperative position, the detent 248 again closes the normally open limit switch 246 which serves to set the time relay 261 in motion so as to energize the solenoid 206, thus moving the plunger 204 downwardly to withdraw the tapered end portion 207 from the notch 202. Fluid under pressure is still applied to the chamber at the right-hand end of the table cylinder 160 so that the table starts its traversing movement due to the fact that the solenoids 194 and 197 again energize to allow exhaust of fluid from the left-hand chamber of the cylinder 160. As soon as the table moves a short distance toward the right, the time relay 261 again operates to deenergize the solenoid 206 which allows the released tension of the spring 205 to return the plunger 204 in an upward direction so that the tapered end portion 207 again rides on the under surface of the notched bar 200.

When the stop blocks 122 and 123 are moved into operative position, this position is determined by a spring-pressed plunger 150 which moves upwardly under the influence of the spring 151 into the notch 152 formed in the under side of the rack bar 230 to prevent further movement of the rack bar 230 toward the right (Fig. 2). During the traversing movement of the table 11 toward the right to position the bearing 16 in operative relation with the grinding wheel 40, the cam 242 carried by the notched bar 200 closes the normally open limit switch 241 which closes a circuit to energize the solenoid 153 which causes a downward movement of the plunger 150 so that fluid under pressure within the cylinder chamber 143 may continue the movement of the piston 131 and the rack bar 130 toward the right (Fig. 2), which movement serves through the gears 128 and 129 to bring the stop blocks 124 and 125 into operative position with relation to the wheel feeding movement. As the table moves so that the notch 201 approaches alignment with the tapered portion 207 of the plunger 204, the table 11 is first slowed down and then stopped in a manner similar to that above described in connection with the approach of the notches 202 and 203. A grinding cycle is then initiated by actuation of the relay 213 and energizing of solenoid 84 to start the forward movement of the grinding wheel to grind the bearing 16 to the predetermined size. After a predetermined time interval, as set by the relay 213, the solenoid 84 is again deenergized and the wheel 40 returned to its rearward or inoperative position. As above described, the detent 248 engages and closes the normally open limit switch 246 to again actuate the time relay 261 which energizes the solenoid 206 to again withdraw the plunger 204 and to again deenergize the solenoids 194 and 197 to open the valves 191 and 196 so that a further movement of the table toward the right is permitted.

During this movement the tapered end portion 207 of the plunger 204 rides on the under surface of the notched bar 200. The movement of the table continues to the extreme right-hand position, at which point the table dog 177 engages the stud 180 on the reverse lever 181 to actuate the reversing valve and thereby reverse the direction of flow of fluid under pressure to the table cylinder. At the same time the reverse lever is actuated, the pawl and ratchet infeed is actuated to advance the grinding wheel a slight distance for the truing operation at the end of the return stroke. As the reversing lever 181 shifts from the full line position (Fig. 2) into the dotted line position 181a, the normally open limit switch 245 is closed to close a circuit so as to energize the solenoid 153 to withdraw the plunger 150 in a downward direction so that it is out of engagement with the under surface of the rack bar and at the same time to energize the solenoid 206 to move the plunger 204 downwardly, thus allowing the table 11 to move at a comparatively fast speed toward the left so that the parts move toward the position illustrated in Fig. 1 with the work in a loading position. The movement toward the left continues until a diamond truing tool 300 carried by the footstock 26 passes across the face of the grinding wheel 40. As the table approaches the position at which the diamond moving toward the right is about to engage the wheel to true the same, the table dog 244 closes the normally open limit switch 243 to deenergize the solenoid 197 which closes the valve 196 and thereafter requires the exhaust of fluid from the table cylinder through the valve 191 and needle valve 192 to slow down the table to a slow truing speed. At the same time, the solenoid 206 is deenergized to allow the plunger 204 to move upwardly so that its tapered end portion rides in an elongated notch 208 formed at the left-hand end of the notched bar 200. The traversing movement of the table 11 at a slow truing speed continues until the table dog 178 engages the lever 181 and shifts it from position 181a into full line position 180, thus reversing the flow of fluid to the table cylinder to traverse it in the reverse direction.

Each time the reversing lever 181 is shifted to change the direction of movement of the table 11, an adjustably mounted arrow point 305 actuated by the reversing lever 181, actuates a fluid pressure control valve 306 to cause one complete reciprocation of a piston 307 within a cylinder 308. The piston 307 is operatively connected to actuate a feed pawl 309 to cause an infeeding movement of the grinding wheel 40 each time the table 11 is reversed. This mechanism has not been described in detail, since it is identical with that disclosed in the prior U. S. Patent to Wood No. 2,071,677 dated February 23, 1937, to which reference may be had for details of disclosure not contained herein. This mechanism serves to advance the grinding wheel 40 before each pass of the truing tool 300 across the face of the grinding wheel.

When the reverse lever is shifted into the full line position (Figs. 1 and 2), the normally open limit switch is again opened. During the shifting of the reverse lever from the dotted line position 181a to full line position 181, an infeeding movement of the wheel is obtained through the feeding mechanism above described to advance the grinding wheel 40 a slight distance before the truing tool makes a second pass across the face of the grinding wheel. As the table approaches the position of parts as illustrated in Figs. 1 and 2, the table is stopped by the deenergizing of the solenoid 194 which cuts off exhaust of fluid from the table cylinder 160, thus stopping the table in a loading position. In this position of the parts, the ground shaft 15 may be removed from the headstock center 20 and footstock center 27 and a new shaft to be ground inserted thereinstead, after which the cycle of operation may be repeated.

It will thus be seen that there has been provided by this invention apparatus in which the various objects hereinabove set forth together with many thoroughly practical advantages are successfully achieved. As many possible embodiments may be made of the above invention and as many changes might be made in the embodiment above set forth, it is to be understood that all matter hereinbefore set forth or shown in the accompanying drawings is to be interpreted as illustrative and not in a limiting sense.

We claim:

1. In a grinding machine having a rotatable grinding wheel, a transversely movable slide to support said wheel, a longitudinally reciprocable table, a rotatable work support thereon including a headstock and a footstock, automatically actuated feed mechanism to feed said slide transversely, means including a table actuated reversing lever to traverse said table longitudinally in either direction, an automatically actuated work steadying rest having a movable work steadying shoe, and electrically operated control means including a limit switch automatically actuated by and in timed relation with the longitudinal movement of said table automatically to move said shoe into operative engagement with the work when the table is moved to a predetermined position.

2. In a grinding machine having a transversely movable rotatable grinding wheel, a longitudinally movable rotatable work support, means including a piston and cylinder to feed said grinding wheel transversely, means including a piston and cylinder to reciprocate said support, a reversing valve therefor, a manually operable adjustable stop-start-speed control valve to control the exhaust of fluid from said cylinder so as to control the normal traversing speed of the table, a solenoid actuated valve to control the passage of fluid from said speed control valve, an electric switch actuated in timed relation with the wheel feeding movement to open said solenoid valve to facilitate a rapid table traversing movement, a second solenoid actuated adjustable valve to by-pass fluid around the first solenoid valve, and a switch which is actuated by and in timed relation with the movement of said table to open said second solenoid valve to facilitate a slow traversing movement of the work support as it approaches a predetermined grinding position.

3. In a grinding machine having a rotatable grinding wheel, a transversely movable slide to support said wheel, a longitudinally movable table, a rotatable work support thereon including a headstock and a footstock, a feeding mechanism to feed said slide transversely, a reciprocating mechanism to traverse said table longitudinally in either direction, a plurality of stops which are arranged successively to limit the forward feeding movement of the grinding wheel slide, a rotatable member to support said stops, means including a rack and gear mechanism to rotate said member successively to move the stops into an operative position, a piston and cylinder to move said rack bar, a control valve to control the admission of fluid to said cylinder, a solenoid to shift said valve in either direction, and electrical control means actuated by and in timed relation with the longitudinal movement of the table to energize said solenoid automatically and successively to position said stops in an operative position to grind a plurality of spaced work pieces to predetermined sizes.

4. In a grinding machine having a rotatable grinding wheel, a transversely movable slide to support said wheel, a longitudinally movable table, a rotatable work support thereon including a headstock and a footstock, a feeding mechanism to feed said slide transversely, a reciprocating mechanism to traverse said table longitudinally in either direction, a plurality of stops, a hydraulically operated cylinder automatically to shift said stops into an operative position, a control valve to control the admission of fluid under pressure to said cylinder, an electrical solenoid to shift said control valve in either direction, and electrical control means actuated by and in timed relation with the longitudinal movement of the table to energize one or the other of said solenoids automatically to shift said valve to admit fluid under pressure to said cylinder successively to position said stops in an operative position successively to grind a plurality of spaced work pieces to predetermined sizes.

5. In a grinding machine having a rotatable grinding wheel, a transversely movable slide to support said wheel, a longitudinally movable table, a rotatable work support thereon including a headstock and a footstock, a feeding mechanism to feed said slide transversely, a reciprocating mechanism to traverse said table longitudinally in either direction, a plurality of stops which are arranged successively to limit the forward feeding movement of the grinding wheel slide, a rotatable member to support said stops, means including a rack and gear to rotate said member, a spring-pressed latch to limit the motion of said rack, a solenoid to withdraw said latch from engagement with said rack bar, and means actuated in timed relation with said table movement to energize said solenoid and withdraw said latch when the table has traversed to a predetermined position.

6. In a grinding machine having a rotatable grinding wheel, a transversely movable slide to support said wheel, a longitudinally movable table, a rotatable work support thereon including a headstock and a footstock, a feeding mechanism to feed said slide transversely, a reciprocating mechanism to traverse said table longitudinally in either direction, a plurality of stops which are arranged successively to limit the forward feeding movement of the grinding wheel slide, a movable member to support said stops, means including a rack bar to move said member successively to position the stops in an operative position, means including a fluid pressure cylinder to move said rack bar longitudinally to successively index said stops into operative positions, a spring-pressed latch arranged to engage said rack bar to limit its endwise movement, a solenoid to withdraw said latch, and means actuated by and in timed relation with the longitudinal movement of the table to energize said solenoid, thereby facilitating endwise movement of the rack bar to position the next stop in an operative position.

7. In a grinding machine having a rotatable grinding wheel, a transversely movable slide to support said wheel, a longitudinally reciprocable table, a rotatable work support thereon including a headstock and a footstock, a hydraulically operated mechanism to feed said slide transversely, means including a piston and cylinder to traverse said table longitudinally in either direction, a control mechanism including a notched control bar and a movable plunger associated therewith, a fluid reversing valve for the table cylinder, a reversing lever to actuate said valve, a speed control valve to throttle the exhaust of fluid from the cylinder, a normally closed valve to control the normal traversing speed of the table, a solenoid to open said valve, a second normally closed adjustable valve to control the slow traversing and truing speed of the table, a solenoid to open said valve, and electrical control means actuated automatically by said control plunger to energize said solenoid so as to normally traverse the table rapidly and automatically to slow down the table movement as it approaches a predetermined grinding position.

8. In a grinding machine having a rotatable grinding wheel, a transversely movable slide to support said wheel, a longitudinally reciprocable table, a rotatable work support thereon including a headstock and a footstock, a hydraulically operated mechanism to feed said slide transversely, means including a piston and cylinder to traverse said table longitudinally in either direction, a control mechanism including a notched control bar and a movable plunger associated therewith, a solenoid to withdraw the control plunger from engagement with the notched control bar, a switch actuated by the table reversing mechanism when in condition for causing a return stroke of the table, and operative connections between said switch and control plunger solenoid whereby the solenoid is energized automatically to facilitate a rapid continuous return stroke of the table to a loading position.

9. In a grinding machine having a rotatable grinding wheel, a transversely movable slide to support said wheel, a longitudinally reciprocable table, a rotatable work support thereon including a headstock and a footstock, a hydraulically operated mechanism to feed said slide transversely, means including a piston and cylinder to traverse said table longitudinally in either direction, a control mechanism including a notched control bar and a movable plunger associated therewith, a solenoid to withdraw the control plunger from engagement with the notched control bar, a normally open limit switch which is arranged to be actuated by the table reversing lever when it is shifted to cause an inoperative return stroke of the table, and operative connections between said switch and the control plunger solenoid whereby the solenoid is energized automatically to facilitate a rapid continuous return stroke of the table to a loading position.

10. In a grinding machine having a rotatable grinding wheel, a transversely movable slide to support said wheel, a longitudinally reciprocable table, a rotatable work support thereon including a headstock and a footstock, a hydraulically operated mechanism to feed said slide transversely, means including a piston and cylinder to traverse said table longitudinally in either direction, a control mechanism including a notched control bar and a movable plunger associated therewith, a hydraulically operated work steadying rest having a work steadying shoe which is movable to and from operative engagement with a work piece, means including a piston and cylinder to actuate said shoe, a control valve to control the admission of fluid under pressure to said cylinder, a solenoid to actuate said valve, and electrical control means including a limit switch actuated by and in timed relation with the longitudinal movement of the work table to energize said solenoid and automatically to move the shoe into operative supporting engagement with a work piece as the table approaches a predetermined grinding position.

CARL G. FLYGARE.
CHARLES C. ALVORD.